United States Patent [19]

Kohzai et al.

[11] 4,374,337

[45] Feb. 15, 1983

[54] DIRECT CURRENT MOTOR HAVING E-SHAPED INTERPOLES

[75] Inventors: Yoshinori Kohzai, Hino; Shigeaki Oyama, Hachioji; Tatsuo Koyama, Hino, all of Japan

[73] Assignee: Fujitsu Fanuc Limited, Tokyo, Japan

[21] Appl. No.: 233,963

[22] Filed: Feb. 12, 1981

[30] Foreign Application Priority Data

Feb. 12, 1980 [JP] Japan ................................ 55-15674

[51] Int. Cl.³ ............................................. H02K 3/16
[52] U.S. Cl. ...................................... 310/186; 310/51; 310/214; 310/224
[58] Field of Search ............... 310/185, 186, 187, 188, 310/190, 224, 177, 214, 218, 257, 259, 46, 51; 322/64–66; 318/525

[56] References Cited

U.S. PATENT DOCUMENTS

| | | | |
|---|---|---|---|
| 2,482,526 | 9/1949 | Watson | 310/190 |
| 2,802,123 | 8/1957 | Tweedy | 310/187 |
| 3,257,572 | 6/1966 | Ludemann | 310/190 |
| 3,493,801 | 2/1970 | Walser | 310/186 |
| 4,220,882 | 9/1980 | Kohzai et al. | 310/186 |
| 4,307,312 | 12/1981 | Kohzai et al. | 310/186 |

*Primary Examiner*—R. Skudy
*Attorney, Agent, or Firm*—Armstrong, Nikaido, Marmelstein & Kubovcik

[57] ABSTRACT

A direct current motor having E-shaped interpoles, each of the E-shaped interpoles comprising interconnecting members which are made of a non-magnetic material having rigidity and which are tightly and irremovably inserted in gaps between a center pole and side poles of the E-shaped interpole. In the direct current motor according to the present invention, the side poles are mechanically interconnected to the center pole, so that noises generated by the vibration of the side poles are greatly reduced.

4 Claims, 6 Drawing Figures

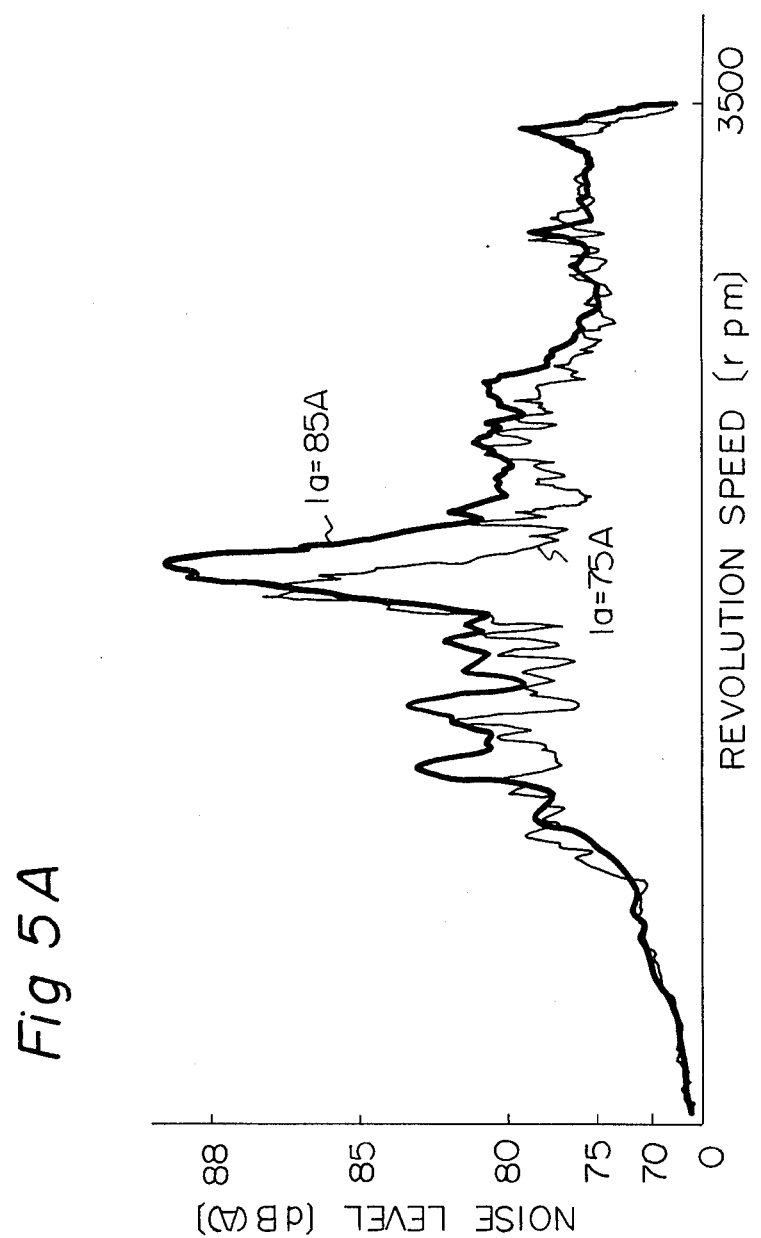

DIRECT CURRENT MOTOR HAVING E-SHAPED INTERPOLES

BACKGROUND OF THE INVENTION (1) Field of the Invention

The present invention relates to a direct current motor having E-shaped interpoles, more particularly to a low noise direct current electric motor having E-shaped interpoles used, for example, in a machine tool.

(2) Description of the Prior Art

In order to reduce the magnetomotive force produced by the interpoles and to improve various operating characteristics of the DC motor, a DC motor having E-shaped interpoles has been proposed in, for example, the Japanese Patent Application Laid Open No. 53-126107 corresponding to U.S. patent application Ser. No. 884,586, now U.S. Pat. No. 4,220,882, by the applicant of the present invention.

FIG. 1 illustrates a prior art DC motor having the E-shaped interpoles disclosed in the above-mentioned Patent Application. The DC motor in FIG. 1 comprises an armature 1, a cylindrical shaped yoke 7 and two main magnetic poles 3 and 4 equidistantly spaced around the outer circumference of the armature 1 having a small gap therebetween and attached to the inner circumference of the yoke 7. The main magnetic poles 3 and 4 have field windings 5 and 6 wound thereon respectively. The field windings 5 and 6 are supplied with electric current in a predetermined direction so that the polarities of the main magnetic poles 3 and 4 are selected to be, for example, N and S, respectively. As a result, the armature 1 is counter clockwisely rotated as shown by arrow a. In this case, some of the armature windings 21, 22 and 23, 24, which are located between the main magnetic poles 3 and 4, exist within commutating zones.

In order to eliminate the counter electromotive force induced in the armature windings 21 through 24 existing within commutating zones, the E-shaped interpoles 8 and 9 are attached to the inner circumference of the yoke 7 by using spacers 25 and 26 made of non-magnetic material, and are located at the intermediate positions along the outer circumference of the armature 1 between the main magnetic poles 3 and 4. The interpole 8 comprises a center pole 81 having an interpole winding 10 wound thereon, and two side poles 82 and 83 disposed respectively in front of and to the rear of the center pole 81 along the direction of the rotation of the armature 1. The interpole winding 10 is connected in series with the armature windings 2, and an armature current passes through the interpole winding 10 in such a direction so that the polarity of the center pole 81 becomes S and the polarity of the side poles 82 and 83 becomes N. The other interpole 9 also comprises a center pole 91 having an interpole winding 11 wound thereon, and two side poles 92 and 93. The interpole winding 11 is also connected in series with the armature windings 2, and the direction of the armature current passing through the interpole winding 11 is selected so that the polarity of the center pole 91 becomes N and the polarity of the side poles 92 and 93 becomes S.

The E-shaped interpoles 8 and 9 are hardly affected by the magnetic field produced by the armature reactions. This is because the magnetic flux caused by the whole of the armature current flowing through the armature windings 2 hardly penetrates the interpoles 8 and 9 due to the existence of the spacers 25 and 26 of non-magnetic material. For example, in the interpole 8, only the magnetic flux $f_1$ and $f_2$, which are caused by the current passing through the armature windings 21 and 22 existing within a commutating zone, pass through the magnetic circuit including the center pole 81, side poles 82 and 83 of the interpole 8 and the armature 1. Thus, the amount of the magnetomotive force produced by the E-shaped interpoles 8 and 9 can be greatly reduced, and therefore, the cross sectional area of the interpole winding can be very small and the heat generated by the interpoles can be reduced.

In the above-mentioned E-shaped interpole, for example the E-shaped interpole 8, the interpole winding 10 is connected in series with the armature windings 2 in the direction such that the magnetic flux produced by the interpole winding 10 has the opposite polarity to that of the above-mentioned magnetic flux $f_1$ and $f_2$, in order to eliminate the magnetic flux $f_1$ and $f_2$ and to generate the magnetic flux used for commutation. Consequently, as illustrated in FIG. 2, magnetic flux $f_1'$ and $f_2'$, whose amount is equal to the difference between the magnetic flux produced by the interpole winding 10 and the magnetic flux $f_1$ and $f_2$ produced by the armature windings existing in a commutating zone, pass through magnetic circuits composed of the center pole 81 and the side poles 82 and 83 of the E-shaped interpole 8 and the armature 1. The magnetic flux $f_1'$ and $f_2'$ cause an attractive force between each of the teeth of the armature 1 and the side poles 82 and 83 and the center pole 81 of the E-shaped interpole 8. Especially, the attractive force between each of the teeth of the armature 1 and the side poles 82 and 83, whose magnetic flux density is relatively high, is very large.

When the armature 1 rotates, each of the teeth of the armature 1 approaches to and departs from the side poles 82 and 83 of the E-shaped interpole 8. Therefore, the side poles 82 and 83 suffer an alternative force whose direction changes alternatively. The repetition frequency of the alternative force changes in proportion to the revolution speed of the armature 1 and the magnitude of the alternative force is in proportion to the magnitude of the armature current. In the condition that the load of the DC motor is heavy or in the condition that the revolution speed of the armature 1 is accelerating or decelerating, the armature current becomes very large so that the alternative force becomes very large. Therefore, in the conventional DC motor having the E-shaped interpoles, the side poles of the E-shaped interpoles vibrate at a relatively high frequency corresponding to the repetition frequency of the alternative force, and thus the conventional DC motor generates a loud noise.

SUMMARY OF THE INVENTION

It is the principal object of the present invention to reduce the loud noise generated by the vibration of the side poles of the E-shaped interpoles of the DC motor.

In order to solve the aforementioned problem of the conventional DC motor having the E-shaped interpoles, the present invention uses the idea of mechanically interconnecting the side poles to the center pole of the E-shaped interpole.

According to the present invention, there is provided a DC motor comprising an armature having armature windings wound thereon and rotating around the central axis thereof, a plurality of main magnetic poles disposed around the armature having field windings wound thereon, and a plurality of E-shaped interpoles disposed at the intermediate position along the outer circumference of the armature between the adjacent main magnetic poles, each of the E-shaped interpoles having a center pole to which an interpole winding is wound and two side poles, characterized in that each of the E-shaped interpoles further comprises interconnecting members which are made of a material having rigidity and which are tightly and irremovably inserted in gaps between the center pole and the side poles, thereby mechanically interconnecting the side poles to the center pole.

BRIEF DESCRIPTION OF THE DRAWINGS

FIGS. 5A and 5B are graphs which illustrate the noise characteristic of the conventional DC motor having the E-shaped interpoles and the DC motor having the E-shaped interpoles according to the present invention, respectively.

DESCRIPTION OF THE PREFERRED EMBODIMENT

Figure 1:
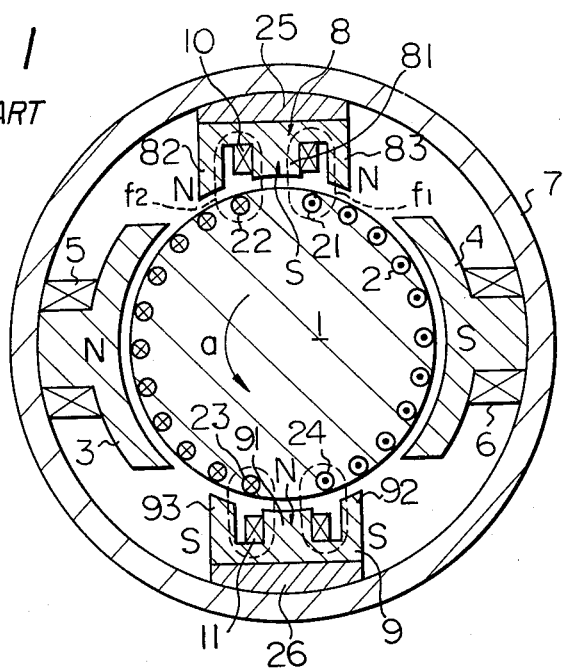
FIG. 1 is a cross sectional view which illustrates a conventional direct current motor having E-shaped interpoles.
Figure 2:
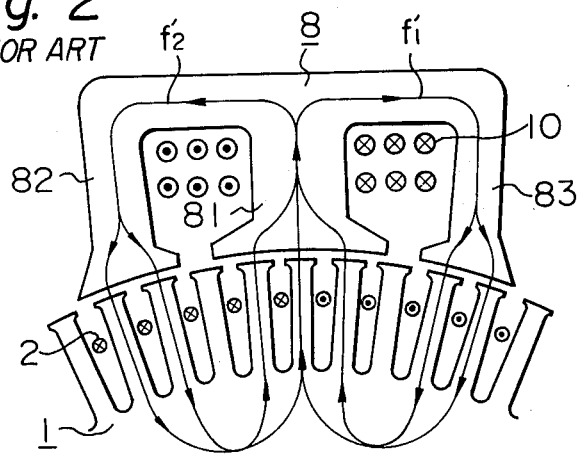
FIG. 2 is a partial cross sectional view which illustrates a part of the conventional direct current motor of FIG. 1 and which is used for explaining the workings of the conventional E-shaped interpoles.
Figure 3:
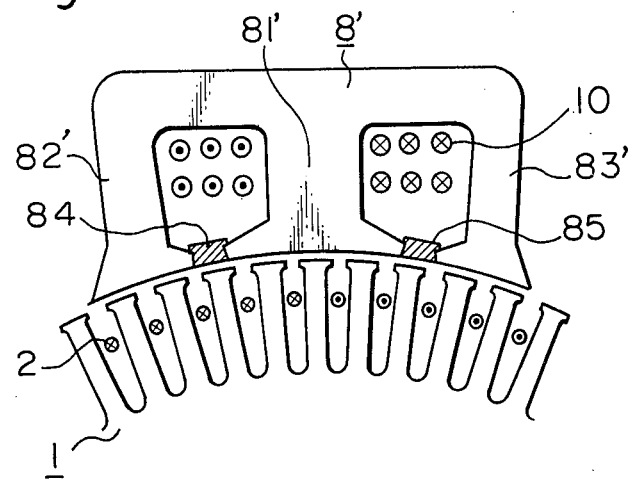
FIG. 3 is a partial cross sectional view which illustrates a part of a direct current motor according to the present invention.

With reference to the attached drawings, an embodiment of the present invention will now be explained. FIG. 3 illustrates a part of a DC motor having E-shaped interpoles according to the present invention. In FIG. 3, only an E-shaped interpole 8' and a part of an armature 1 are shown, and the other portions of the DC motor as an embodiment of the present invention are the same as those of the conventional DC motor of FIG. 1 except for the E-shaped interpole 9' which is not shown in FIG. 3 and which has the same structure as the E-shaped interpole 8'. The E-shaped interpole 8' of FIG. 3 comprises a center pole 81', side poles 82' and 83', and an interpole winding 10 wound on the center pole 81'. The E-shaped interpole 8' of FIG. 3 further comprises, according to the present invention, wedge-shaped members 84 and 85 which are tightly and irremovably inserted in gaps between the center pole 81' and the side poles 82' and 83', for example gaps between a pole shoe portion of the center pole 81' and pole shoe portions of the side poles 82' and 83', respectively. Each of the wedge-shaped members 84 and 85 are made of a nonmagnetic material having rigidity, for example, brass, copper, plastics or stainless steel. The wedge-shaped members 84 and 85 mechanically interconnect the side poles 82' and 83', at the end portions thereof, to the center pole 81' and help to prevent mechanical vibration of the side poles 82' and 83'.

Figure 4:
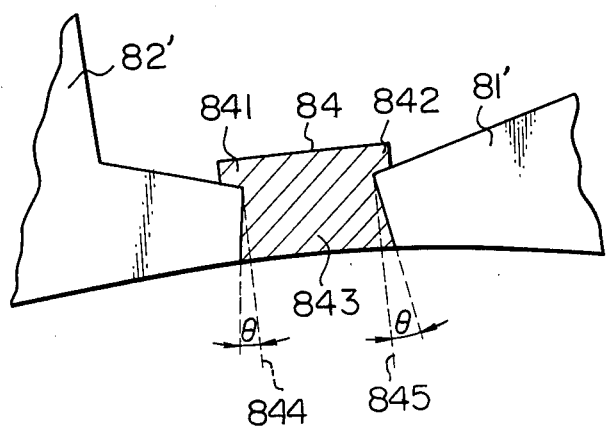
FIG. 4 is a partial cross sectional view which illustrates a part of an E-shaped interpole used in a direct current motor according to the present invention.

FIG. 4 is a enlarged view of a part of the E-shaped interpole 8' of FIG. 3. As illustrated in FIG. 4, the above-mentioned wedge-shaped member, for example, 84 comprises convex portions 841 and 842 and a wedge portion 843. The width of the wedge portion 843 of the wedge-shaped member 84 increases from the portion remote from the armature 1 to the portion adjacent to the armature 1; that is, the wedge portion 843 has small taper angles $\theta$ from parallel lines 844 and 845. The convex portions 841 and 842 are formed at the narrow end portion of the wedge-shaped member 84. A gap between the pole shoe portion of the center pole 81' and the pole shoe portion of the side pole 82' also increases from the portion remote from the armature 1 to the portion adjacent to the armature 1 along the shape of the wedge-shaped member 84. Therefore, the wedge-shaped member 84 tightly and irremovably fits into the gap and does not come out therefrom. It should be noted that the vibration of the side poles 82' and 83' can be effectively suppressed when the interconnecting member 84 is inserted in the gap between end portions, i.e., pole shoe portions, of the side poles 82' and 83' and end portion, i.e., pole shoe portion, of the center pole 81'.

Figure 5B:
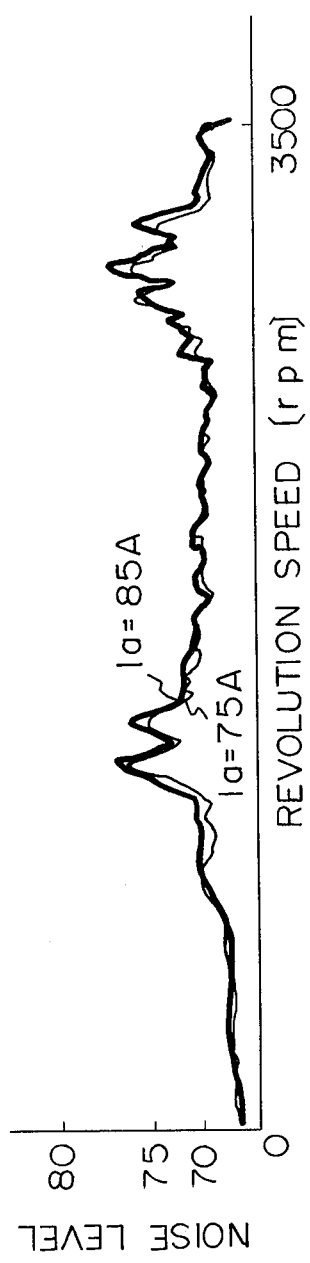

FIGS. 5A and 5B illustrate characteristics of the noise of a conventional DC motor having the E-shaped interpoles and the DC motor having the E-shaped interpoles according to the present invention, respectively. Graphs of FIGS. 5A and 5B show noise levels generated from each of the DC motors when the revolution speed of the rotor is changed from zero to 3500 rpm (revolution per minute) when the armature current is constant (i.e. 75 A and 85 A). The noise level is measured at a distance of about 1 meter from the DC motor in the direction perpendicular to the revolution shaft of the rotor. The noise level is shown in the unit of dB(A), where (A) shows a type of weighting curve of a frequency characteristic in noise measurement. The weighting curve of type A, which is used in the above-mentioned noise measurement, has a frequency characteristic approximately similar to that of a human ear.

As illustrated in FIG. 5A, the conventional DC motor generates salient peak noise near a particular revolution speed (approximately 1800 rpm) and, moreover, generates noises of a relatively high level throughout the whole revolution speed. Especially when the armature current is higher ($I_a = 85$ A), the noise becomes very loud.

On the other hand, as illustrated in FIG. 5B, the noise level in the DC motor according to the present invention is very low throughout the whole revolution speed and a salient peak noise is not generated from the DC motor according to the present invention.

As mentioned above, the DC motor having the E-shaped interpoles according to the present invention comprises the wedge-shaped members which are tightly and irremovably inserted between the center poles and the side poles of the E-shaped interpoles and which are made of a material having rigidity. Therefore, each of the side poles is mechanically interconnected to the corresponding one of the center pole, so that the noise generated by the vibration of the side poles is greatly reduced, even when the armature current is large, that is, even when the load of the DC motor is heavy.

We claim:

1. A direct current motor comprising an armature having armature windings wound thereon and rotating around the central axis thereof, a plurality of main magnetic poles disposed around said armature having field windings wound thereon, and a plurality of E-shaped interpoles disposed at the intermediate position along the outer circumference of said armature between the adjacent magnetic poles, each of said E-shaped interpoles having two side poles and a center pole to which an interpole winding is wound, characterized in that each of said E-shaped interpoles further comprises interconnecting members which are made of a material having rigidity and which are tightly and irremovably wedged in gaps between said center pole and said side poles, thereby mechanically interconnecting said side poles to said center pole to prevent vibrations of the side poles.

2. A direct current motor as set forth in claim 1, wherein each of said interconnecting members is inserted in a gap between a pole shoe portion of said center pole and a pole shoe portion of said side pole.

3. A direct current motor as set forth in claim 2, wherein each of said interconnecting members is a wedge-shaped member having a wedge portion and convex portions at the narrow side thereof, and the width of said gap increases from the portion remote from said armature to the portion adjacent to said armature along the shape of said wedge-shaped member, each of said interconnecting members being supported irremovably within said gap at said convex portions and said wedge portion thereof.

4. A direct current motor as set forth in claim 1, 2 or 3, wherein said interconnecting members are made of non-magnetic materials.

* * * * *